United States Patent
Sastry

(10) Patent No.: US 7,778,220 B2
(45) Date of Patent: Aug. 17, 2010

(54) METHOD TO LOADBALANCE AMONG MOBILE IPV6 HOME AGENTS

(75) Inventor: Venkateshwara Sastry, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 936 days.

(21) Appl. No.: 11/593,501

(22) Filed: Nov. 6, 2006

(65) Prior Publication Data
US 2008/0107070 A1 May 8, 2008

(51) Int. Cl.
*H04W 4/00* (2009.01)
(52) U.S. Cl. .................. 370/329; 370/331; 455/453
(58) Field of Classification Search ................ 370/329, 370/331; 455/453
See application file for complete search history.

(56) References Cited

U.S. PATENT DOCUMENTS

2003/0195002 A1* 10/2003 Singhal et al. ............. 455/436
2004/0202126 A1* 10/2004 Leung et al. ............... 370/331

OTHER PUBLICATIONS

Faizan__Jul. 2005__pp. 178-187__ICPS-05-Proceedings.pdf.*
Huang__2002__pp. 367-376__HiPC-2002-9th-International-Conference.pdf.pdf.*
Balasubramanian__2004__EDOC-2004__Proceedings-of-the-8th-IEEE-EDOC-Conference.pdf.*
Rong Zhang, Xiaolong Huang, K. Zhang, Load Balance for Distributed Home Agents in Mobile IPv6, Nov. 2003, 15 pages.
Jiun Jie Wu, Load Balancing Policy for Multiple Home Agents Mobile IP Network; National Cheng Kung University Thesis, Jul. 2004, 71 pages.
Johnson, et al., RFC 3775 Mobility Support in IPv6, The Internet Society Jun. 2004.
Jahanzeb Faizan et al., Introducing Reliability and Load Balancing in Mobile IPv6 based Networks, 17 pages, May 2008.

* cited by examiner

*Primary Examiner*—Charles N Appiah
*Assistant Examiner*—Alexander Yi
(74) *Attorney, Agent, or Firm*—Trellis IP Law Group, PC

(57) ABSTRACT

The invention relates to load balancing the binding creation on a home agent with a mobile node in an IPV6 network. A home agent serving a prefix learns about load on other home agents and when a home agent address discovery request from a mobile is received by a home agent, the home agent processing the message returns addresses of the least loaded home agent to the mobile node.

28 Claims, 8 Drawing Sheets

US 7,778,220 B2

METHOD TO LOADBALANCE AMONG MOBILE IPV6 HOME AGENTS

BACKGROUND OF THE INVENTION

1. Field of the Invention

The present invention generally relates to a mobile network, and more particularly to home agents and a method for reliable load balancing of the same on a mobile IPv6 network.

2. Description of Related Art

Mobile IPv6 refers to a new network protocol where nodes remain reachable while moving around in the IPv6 Internet. As specified in "Mobility Support in IPv6," RFC 3775, available from the Internet Engineering Task Force, is an improved version over the existing Mobile IPv4 standard, which has served as the underlying protocol for the internet for almost 30 years. Its robustness, scalability, and limited feature set or the prior standard are being challenged by the growing need for new IP addresses by a plethora of mobile communication devices. As a result, the Mobile IPv6 protocol has been developed for supporting wireless communications where the mobile nodes may roam around the network.

One of the drawbacks of the conventional Mobile IPv6 protocol occurs when the packets are sent during a home agent reassignment request or during periods when the active home agent becomes overloaded because of the increased data traffic of the mobile nodes that are already registered. The network traffic bottleneck is the result of unbalanced dynamic distribution of load among the home agents in the home network at any given time. Furthermore, tunnels created between a large number of the mobile nodes, which includes the encapsulation and routing of the packets to the active home agent and the updating of the binding cache randomly, result in the overloading of workload of the active home agent.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

Figure 1:
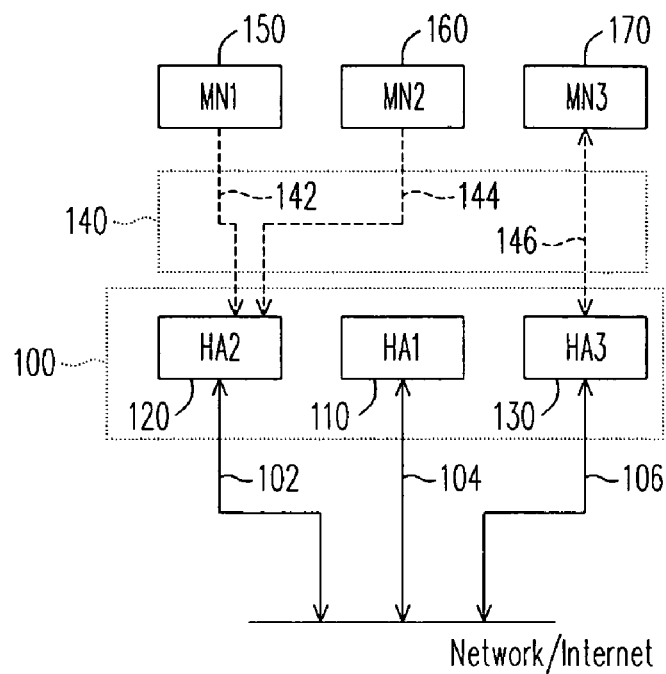
FIG. 1 is a functional block diagram illustrating a communication flow between mobile nodes and home agents in a home network, according to an embodiment of the present invention.

The present invention will now be described with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art.

In the drawings, whenever the same element reappears in subsequent drawings, it is denoted by the same reference numeral.

For the sake of convenience of understanding, some key terms are first presented.

A "home agent" ("HA" hereinafter) is defined as a hardware module, such as a router, a computer with a broadcast antenna, a wireless access point, or any other similar devices configured on a mobile node's home network with which the mobile node has registered its current care-of address. While the mobile node is away from home, the home agent intercepts packets on the home network destined to the mobile node's home address, encapsulates them, and tunnels them to the mobile node's registered care-of address.

A "mobile node" is a node such as a laptop, PDA with wireless capability, mobile phone, or any mobile wireless communication device than can change its point of attachment from one link to another, while still being reachable via its home address.

A "home link" is the link on which a home subnet prefix of a mobile node is defined, and the home subnet prefix is the IP subnet prefix corresponding to a home address of the mobile node.

A "home network" is a network where a mobile node has its permanent IP address, without needing a care-of address.

A "care-of address" is a unicast routable address associated with a mobile node while visiting a foreign link, and the subnet prefix of the IP address is the foreign subnet prefix. Among the multiple care-of addresses that the mobile node may have at any given time, the one registered with the home agent of the mobile node for a given home address is called its "primary" care-of address.

A "binding" is association of a home address of a mobile node with a care-of address for the mobile node, along with the remaining lifetime of that association.

A "load" of a HA is defined as the average packet flow over the interface towards mobile node and it is expressed as packets/sec.

As used herein, the words "may" and "may be" are to be interpreted in an open-ended, non-restrictive manner. At minimum, "may" and "may be" are to be interpreted as definitively including structure or acts recited.

A typical environment in which the present invention is practiced comprises a mobile IPv6 network that may include one or more of mobile nodes, home agents, home networks, and foreign networks. The home agents may be in a form of an active home agent or an inactive home agent. The active home agent for a MN is defined as a home agent which receives and processes the mobile IP messages from the MN and the inactive home agent for the MN is a home agent which does not receive and process the mobile IP messages from the MN. The communication between each of the mobile nodes and the home network is implemented by a tunnel. In accrodance with the Mobile IPv6 protocol, mobile nodes remain reachable while moving about in the Mobile IPv6 network. Each mobile node is identified by its home address regardless of its current physical or logical point of attachment to the internet or the Mobile IPv6 network.

While situated away from its binding home network, the mobile node remains associated with a care-of address, which provides information about the current location of the mobile node. IPv6 packets addressed to the home address of the mobile node are routed through its care-of address to the mobile node. The Mobile IPv6 protocol enables the home agents to cache the binding of the mobile node's home address with its care-of address, and then sends the packets destined for the mobile node directly to it at the aforementioned care-of address. All nodes in the Mobile IPv6 network, whether mobile or stationary, can communicate with the mobile node, regardless of its current point of attachment to the internet or the Mobile IPv6 network.

Under the IPv6 protocol, a mobile node can always be reached using the same globally unique IPv6 address, which is a static home address stored in the home agent, regardless of its physical location at any given time. The initiation of an active communication link between a mobile node and an active home agent is performed through the creation of a binding. A binding is an association of the home address of the mobile node with a care-of address for that mobile node, along with the remaining lifetime of that association. The binding between the mobile node and the active home agent, also known as a registration procedure, is described as follows.

A plurality of home agents (HAs), including one or more active home agents and one or more inactive home agents, exchange router advertisement messages with each other, and hence learn about status of other home agents in the home network. When a home agent receives a home agent address discovery message from a mobile node, the home agent sends a home agent address discovery reply message to the mobile node with the list of available home agents in the home network. The mobile node selects one of the home agents from the aforementioned list based upon arbitrarily requirements, and then sends a binding update to that home agent. Thus, the binding is established between the mobile node and the active home agent. Because the binding established between the active home agent and the mobile node is selected based upon an arbitrary requirement, the load on the active home agent needs to be optimized. In accordance with the present invention, the load is distributed among home agents on the list of available home agents in the home network to prevent the active home agent from becoming overloaded.

The invention provides a method for reliable load balancing on home agents in a Mobile IPv6 network. A method for detecting and recovering from home agent failures is also provided herein. In an embodiment of the invention, all of the home agents exchange modified router advertisement messages with each other and, hence, learn about other home agents in the network. When a home agent receives a home agent address discovery message from a mobile node, the home agent sends home agent address discovery reply message to the mobile node with information about the least loaded home agent (LHA). The mobile agent locates the least loaded home agent (LHA) and sends a binding update request to the least loaded home agent. Thus, a binding communication is established between the mobile node and the least loaded home agent.

By periodically exchanging modified router advertisement messages with each other, the load information including load factors of other home agents are gathered and stored in a load balancing table. The load factor proposed in the invention is generated according to a load factor generation algorithm in considering with one or a plurality of status in the home agent, which will be described in details later. The load balancing table is preferably implemented in a software format and is stored in a memory device in each home agent.

In another embodiment, other mechanism like a dynamic feedback protocol (DFP) or a specified discovery protocol can also be used for periodically gathering load information from other home agents. The dynamic feedback protocol (DFP) enables a home agent in a local load-balancing environment to collect status information from one or more real host servers, convert the information to relative weights, and report the weights to a DFP manager, such as an IOS server load balancing (SLB) device. The DFP manager factors in the weights when load balancing the real servers. The specified discovery protocol can be, for example, a Cisco discovery protocol (CDP), which sends out periodic interface updates to a multicast address in order to make itself known to neighbors. Since it is a layer two protocol, these packets (frames) are not routed. Further examples for implementing the dynamic feedback protocol (DFP) or the Cisco discovery protocol (CDP) will be illustrated in the following description.

The method for reliable load balancing on home agents in a Mobile IPv6 (MIPv6) network is introduced with reference to the following description and accompanying drawings. FIG. 1 is an architecture of a communication network including a Mobile IPv6 network connecting to a network line or the internet. In the Mobile IPv6 network, a home network 100 including a plurality of home agents 110, 120 and 130 is provided (for explanation, the home agents 110, 120 and 130 are denoted as home agents HA1, HA2 and HA3). The home agents 110, 120 and 130 are connected to the network line or the internet, and/or connected to a plurality of mobile nodes 150, 160 and 170 (for explanation, the mobile nodes 150, 160 and 170 are denoted as mobile nodes MN1, MN2 and MN3) through a wireless network 140.

Tunneled MPIv6 data paths 142 and 144 are respectively established between the mobile nodes MN1, MN2 and the home agent HA2, the home agent HA2 is an active home agent. Tunneled MPIv6 data path 146 is established between the mobile node MN3 and the home agent HA3, the home agent HA3 is also an active home agent. No tunneled MPIv6 data path is established with the home agent HA1, the home agent HA1 is an inactive home agent.

Figure 2:
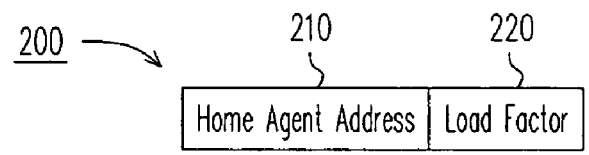
FIG. 2 is a flow diagram illustrating the state transitions between home agents with respect to the exchange of load information for load balancing according to an embodiment of the present invention.
Figure 2:
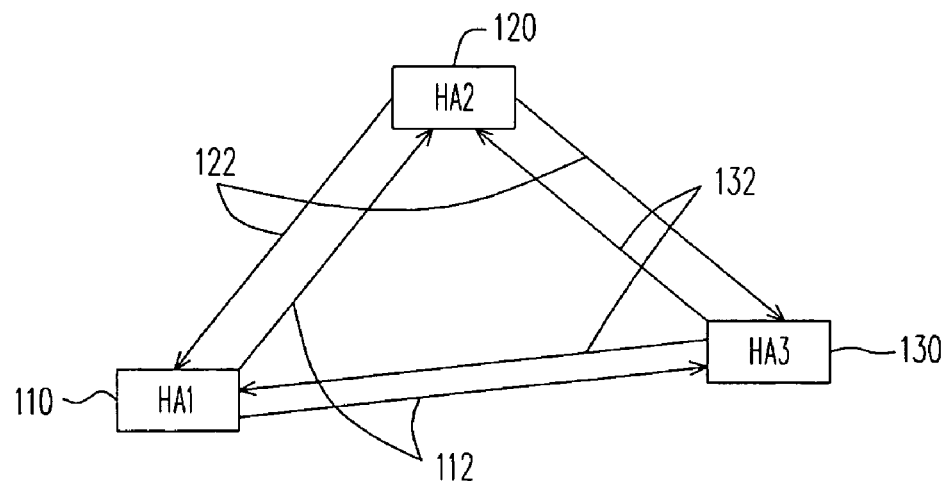
Figure 3:
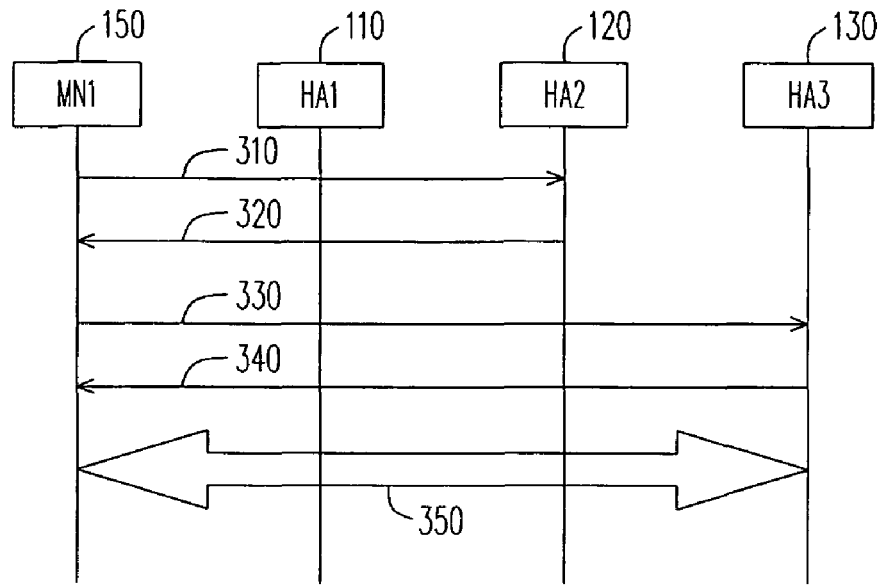
FIG. 3 is a diagram illustrating a method for creating binding and a tunnel between a mobile node and the least loaded home agent (LHA), according to an embodiment of the present invention.

A reliable load balancing of the binding creation on the home agents HA1, HA2 and HA3 in the Mobile IPv6 network, is proposed according to an embodiment of the invention. FIG. 2 shows a method for periodically exchanging information between all home agents in the Mobile IPv6 network. As shown in FIG. 2, the home agent HA1 periodically sends load information 112 to the other home agents HA2 and HA3. The home agent HA2 periodically sends load information 122 to the other home agents HA1 and HA3, and the home agent HA3 periodically sends load information 132 to the other home agents HA1 and HA2. The aforementioned load information can be a load factor, and the format for carrying the load factor depends on the protocol selected in the Mobile IPv6 network. In one embodiment, the format can be achieved as an extension of a message broadcasting between the home agents. For example, as shown in FIG. 2, a generic format to carry the required information to distribute the load can be a modified router advertisement message 200 including a field of a home agent address 210 and a field of the load factor 220. However, as mentioned above, the format to carry the required information to distribute the load depends on the protocol selected, for example, the dynamic feedback protocol (DFP), Cisco discovery protocol (CDP), or other protocols which can periodically exchange information between all home agents.

Figure 4:
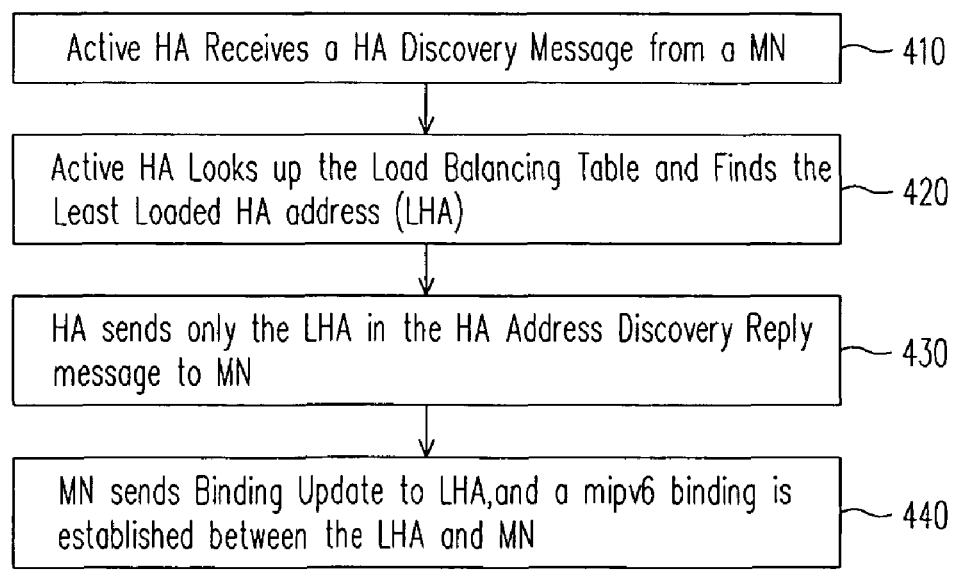
FIG. 4 is a flowchart of the creation of the binding between a mobile node and a home agent, according to an embodiment of the present invention.

A flow chart for explaining the reliable load balancing method on home agents in a Mobile IPv6 (MIPv6) network, according to an embodiment of the invention, is described with reference to FIG. 4. First of all, a home agent HA receives a home agent discovery message from a mobile node (MN), as in step 410. The active home agent HA looks up the load balancing table and finds the least loaded home agent (LHA) address in the load balancing table, as in step 420. Only the address of the least loaded home agent (LHA) is sent in a home agent address discovery reply message to the MN by the active home agent HA in response to the home agent discovery message, as in step 430. The MN sends a binding update request to the LHA, and a MIPv6 binding is established between the LHA and the MN, as in step 440.

Figure 5A:
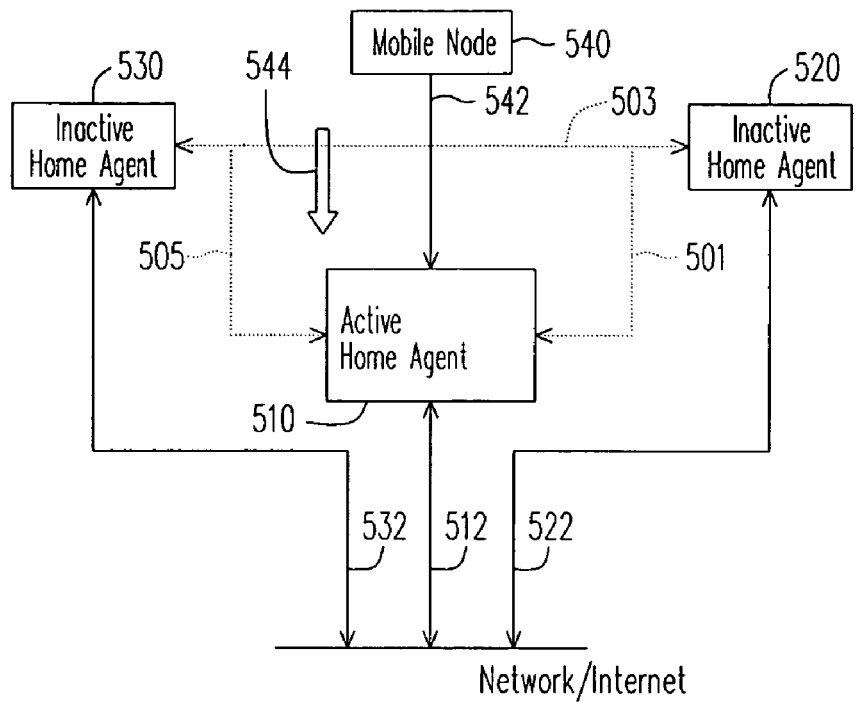
FIGS. 5A, 5B, and 5C are functional block diagrams illustrating creation of a binding between a mobile node and a home agent with load balancing capability, according to an embodiment of the present invention.
Figure 5B:
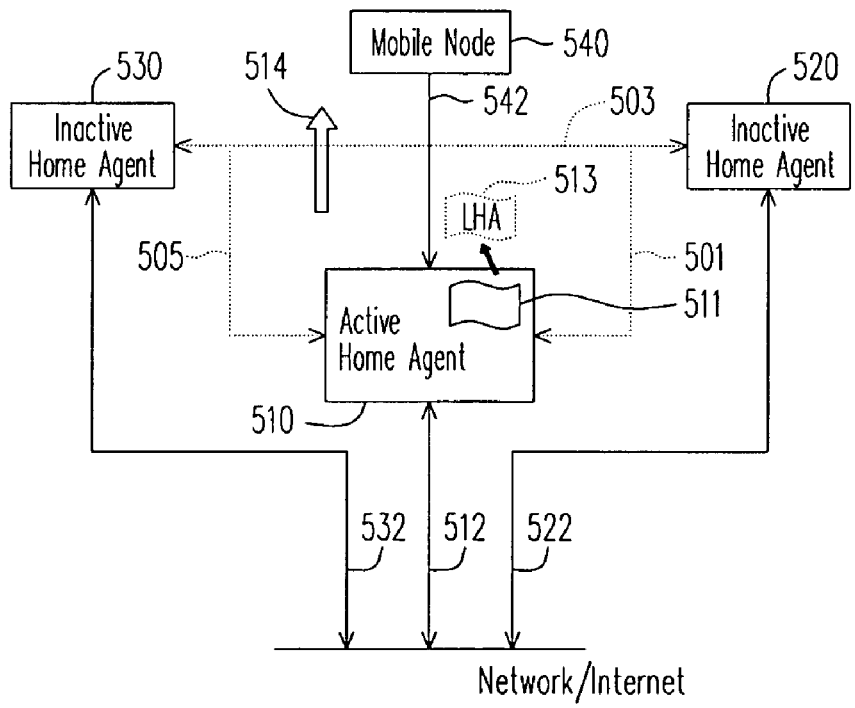
Figure 5C:
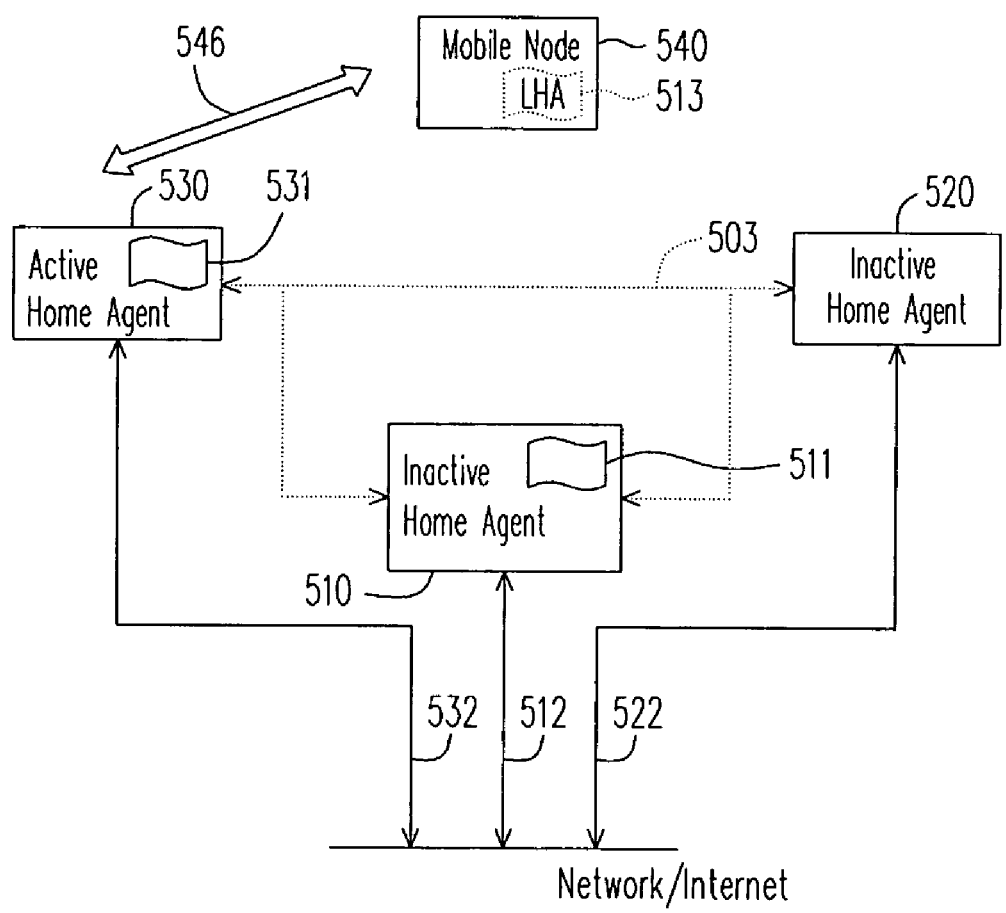

FIGS. 5A, 5B and 5C illustrate a call flow under Mobile IPv6 protocol for creation of a binding between a mobile node and a home agent with load balancing capability, according to an embodiment of the present invention. Referring to FIG. 5A, a tunneled MPIv6 data path 542 is established between a mobile node 540 and an active home agent 510, and the other home agents 520 and 530 are inactive home agents. The active home agent 510 and the inactive home agents 520 and 530 are connected to a network line or the internet through lines 512, 522 and 532. In the embodiment, all of the home agents 510, 520 and 530 understand the load on each of the other home agents through a load balancing process. In one embodiment, the load balancing process can be achieved by periodically exchanging load information to each other, for example, the communication 501, 502 and 503 to understand the load on each of the other home agents.

As shown in FIG. 5A, a discovery request 544 is sent from the mobile node 540 to the active home agent 510, for example, a home agent discovery message is sent from the mobile node.

Referring to FIG. 5B, the active home agent 510 looks up a load balancing table 511 in the active home agent 510 to find an address of a least loaded home agent 513 in the load balancing table 511. The address of the least loaded home agent 513 is sent from the active home agent 5 10 to the mobile node 540.

Referring to FIG. 5C, the mobile node 540 sends a binding update request to the LHA, and, in the present embodiment, the inactive home agent 530 is the LHA and receives the binding request from the mobile node 540. The inactive home agent 530 becomes an active home agent and a MIPv6 binding is established between the active home agent 530 and the mobile node 540. At this moment, the active home agent 510 becomes an inactive home agent.

The invention provides a method for reliable load balancing on home agents in a Mobile IPv6 network. In the embodiment of the invention, a modified router advertisement message is proposed for periodically exchanging the load information with each other. In one embodiment, the modified router advertisement message is the standard router advertisement message under Mobile IPv6 protocol with a specified field to carry the load information.

Figure 6:
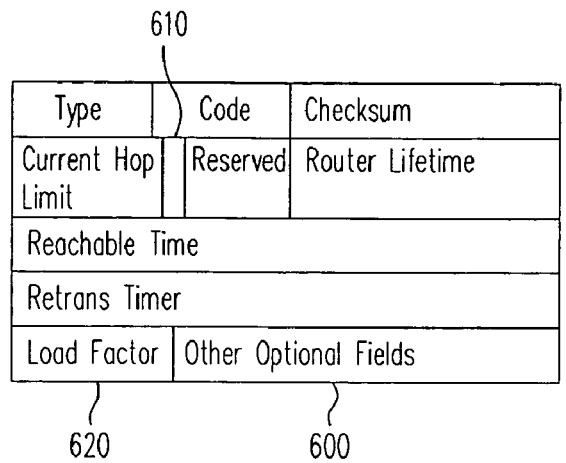
FIG. 6 is a block diagram illustrating a modified router advertisement message format, according to an embodiment of the present invention.

Refer to FIG. 6, the modified router advertisement message 600 may have the established bit of up to 8 bits or 12 bits stored in an optional field. The modified router advertisement message 600 includes the following fields: Type, Code, Checksum, Current hop limit, Reserved, Router Lifetime, Reachable time, Retrans Timer, a plurality of configuration flags 610, a load factor 620, and other optional fields.

As discussed above, according to an embodiment of the present invention, the load balancing mechanism may be implemented in the form of the modified router advertisement message as illustrated in FIG. 6, and the load factor may be calculated by a load factor generation algorithm.

Figure 7:
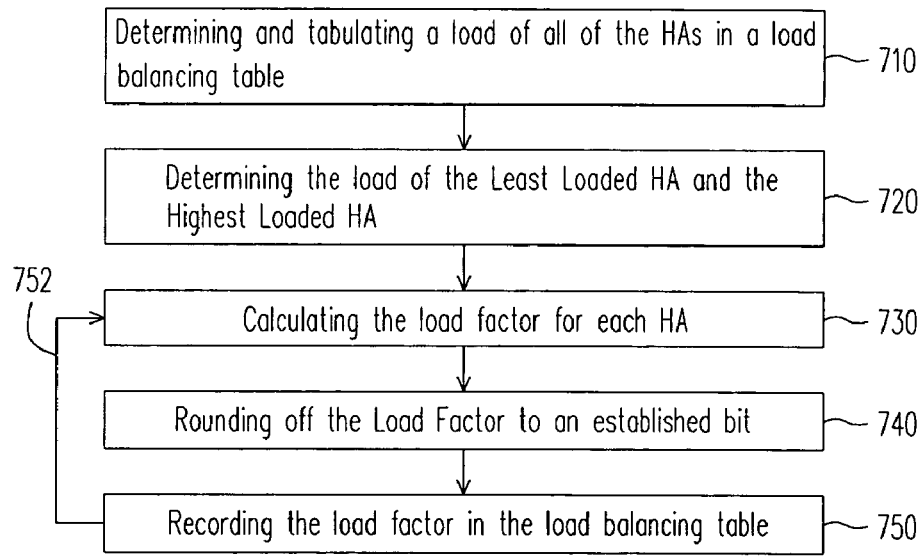
FIG. 7 is a flowchart illustrating a load factor generation algorithm, according to an embodiment of the present invention.

Referring to FIG. 7, a flow chart for explaining the load factor generation algorithm is provided. In step 710, all of the loads of the home agents in a home network are determined and tabulated in a load balancing table. The load of the least loaded home agent (LHA) and of the highest loaded home agent are determined in the home network, as in step 720. The load factor is calculated for each home agent, as in step 730. The load factor may be calculated by the one of the following two equations:

$$\text{Load Factor} = (\text{Load on the home agent} - \text{Load on the lowest loaded home agent})/(\text{Load on the highest loaded home agent} - \text{Load on the lowest loaded home agent}) \quad [1]$$

or $$\text{Load Factor} = \max(C\text{-load}, M\text{-load}, B\text{-load}, N\text{-load}) \quad [2]$$

In step 740, the load factor may be rounded off to an established bit. The distributed load factors for each of the home agents are recorded in the load balancing table, as in step 750. The load factors for all home agents will be periodically generated by the load factor generation algorithm and exchanged by, for example, the modified router advertisement messages to other home agents in the home network.

In calculating the load factor in aforementioned Equation [2], the following contributing factors may be taken into account, alone or in combination, includes: (1) CPU availability, (2) memory availability, (3) bandwidth availability, and (4) number of bindings created. In Equation [2], C-load, M-load, B-load, and N-load represent a plurality of parameter values which are set between 0 and 1, respectively. C-load is a predicted load on the CPU of the home agent, and which may be expressed by the following equation:

$$C\text{-load} = (1-P)*(C\text{-load of the previous reporting period}) + P*(\text{average utilization of the CPU in the current reporting period}) \quad [2\text{-}1]$$

wherein P is set between 0 and 1; and P captures the historical CPU utilization. M-load is a predicted load on the available/used memory, and the M-load may be expressed by the following equation:

$$M\text{-load} = (\text{amount of actual memory used in the available/used memory})/(\text{total memory available in the available/used memory}) \quad [2\text{-}2]$$

B-load is a load factor parameter value for the available bandwidth for new bindings, which may be expressed by the following equation:

$$B\text{-load} = (\text{the total assigned bandwidth})/(\text{total available bandwidth}) \quad [2\text{-}3]$$

wherein the total assigned bandwidth is the sum of the assigned bandwidth to each binding based on the QoS (Quality of Service) settings for each binding. Furthermore, N-load is a load factor parameter value for determining the number of bindings that can be established in a home network, which may be expressed by the following equation:

$$N\text{-Load} = (\text{the number of bindings established}) / (\text{maximum number of bindings permitted}) \quad [2\text{-}4]$$

Once the calculation of the home agent, the load balancing mechanism, and the load factor using the load factor generation algorithm are established, an overall load balancing procedure for the home agent in a home network is described.

According to another embodiment of the present invention, a home agent reassignment method may be used. The home agent reassignment method is useful in situations where there is an anticipation of an excessive amount of rapid changes or fluctuations of the LHA in the binding cache in one or more of the home agents, thereby tying up valuable network bandwidth and resulting in unacceptable level of network inefficiencies. The home agent reassignment method may be implemented as the following procedure. First of all, the load on each home agent is gathered from the modified router advertisement messages. The load factor on a current active home agent is determined to see if it is above a threshold load factor. If the load factor of the current active home agent is above the threshold load factor, it means that the current active home agent is overloaded and the established tunneled MPIv6 data path with a mobile node is ready to be reassigned to other home agent. Likewise, the least loaded home agent (LHA) is determined based upon the load factor by looking up the load balancing table in the current active home agent. The least loaded home agent (LHA) is designated as the active home agent being assigned a new tunneled MPIv6 data path with the mobile node. The binding cache of the current active home agent and the designated home agent are updated accordingly, and packet transmission is commenced.

Figure 8:
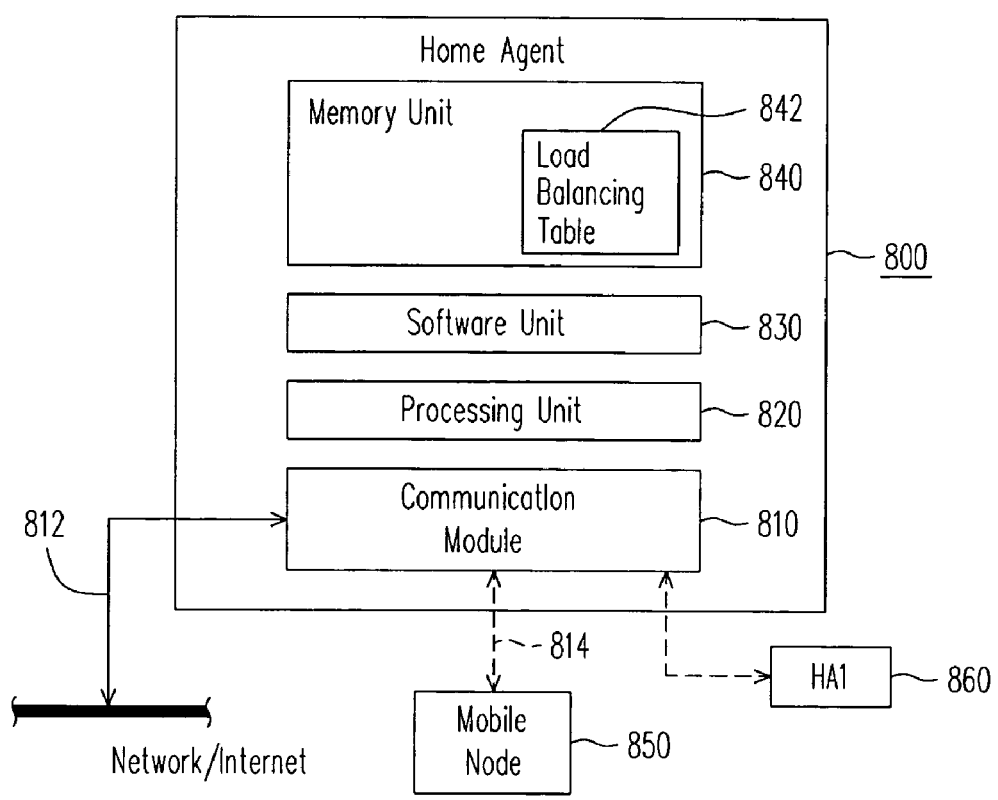
FIG. 8 is a block diagram illustrating components of a home agent, according to an embodiment of the present invention.

A home agent has capability of performing the reliable load balancing method in a Mobile IPv6 network is described with reference to FIG. 8, according to an embodiment of the invention. The home agent 800 includes a wireless communication module 810, a processing unit 820, a software unit 830, and a memory unit 840. The wireless communication module 30 is a module that facilitates RF wireless communication at a plurality of frequencies and mediums, and may have one or more antennas in a variety of configurations. The wireless communication module 30 provides communication between the home agent 800 and a wired network or the internet, or one or more mobile nodes, or other home agent HA1 in the Mobile IPv6 network. The memory unit 840 stores a load balancing table 842 for the load balancing mechanism of the present invention. The software unit 830 may be used for performing a plurality of Mobile IPv6 functionalities. Furthermore, the processing unit 820 may be used to perform a plurality of periodic binding updates between the home agents and a plurality of mobile nodes, and to process, encapsulate, and tunnel a plurality of network packets to and from the mobile nodes via the wireless communication modules 810.

Figure 9:
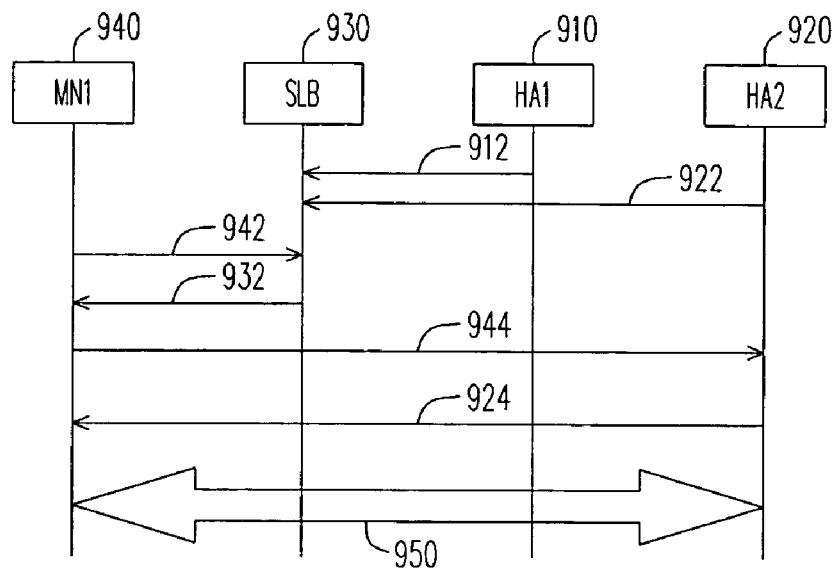
FIG. 9 is a diagram illustrating a method for creating binding and a tunnel between a mobile node and the least loaded home agent (LHA) using dynamic feedback protocol (DFP), according to another embodiment of the present invention.

According to another embodiment of the present invention, the load balancing mechanism may be in the form of a plurality of advertisements sent to a known multicast address based upon different protocols, and the load factor is calculated by using a load factor generation algorithm of the invention as previously discussed. Referring to FIG. 9, an example is provided for illustrating the creation of the binding and the tunnel between a mobile node (MN1) 940 and the least loaded home agent (LHA) by using a dynamic feedback protocol (DFP) according to another embodiment of the present invention. In the embodiment, the dynamic feedback protocol (DFP) is used for creating a binding and a tunnel between a mobile node (MN) and a least loaded home agent (LHA). Under the DFP, a DFP agent subsystem enables client subsystems to act as the DFP agents for sending weight or load information to the DFP manager, such as an IOS Server Load Balance (SLB). The DFP agent subsystem includes the load balancing systems for the home agents on the Mobile IPv6 networks other than the SLB.

In FIG. 9, a home agent 910 ("HA1" hereafter) and a home agent 920 ("HA2" hereafter) report their respective load using dynamic feedback protocol (DFP) to the IOS Server Load Balancing device 930 ("SLB" hereafter), as shown in the transmission actions 912 and 922. HA address discovery message 942 is then sent from a home node 940 ("MN1" hereafter) to the SLB. A HA address discovery reply message 932 with HA2 identified as LHA (assuming that HA2 is the LHA) is replied to the MN1. A binding update request 944 is then sent from MN1 to HA2, and a binding acknowledgment 924 is sent from HA2 to MN1. A binding and tunnel 950 is established between MN1 and the HA2.

Under the method illustrated in FIG. 9 for load balancing of HAs using DFP, each of the HAs may implement the DFP Agent. The DFP agents may report the computed load on the HA, scale the computed load to a format acceptable to the DFP protocol, and then report it to an SLB. The SLB resides in the signaling path of the Mobile IPv6 messages as illustrated in FIG. 9. The SLB intercepts the HA address discovery message and responds with a correct HA (the LHA, which is HA2 shown in FIG. 9).

Figure 10:
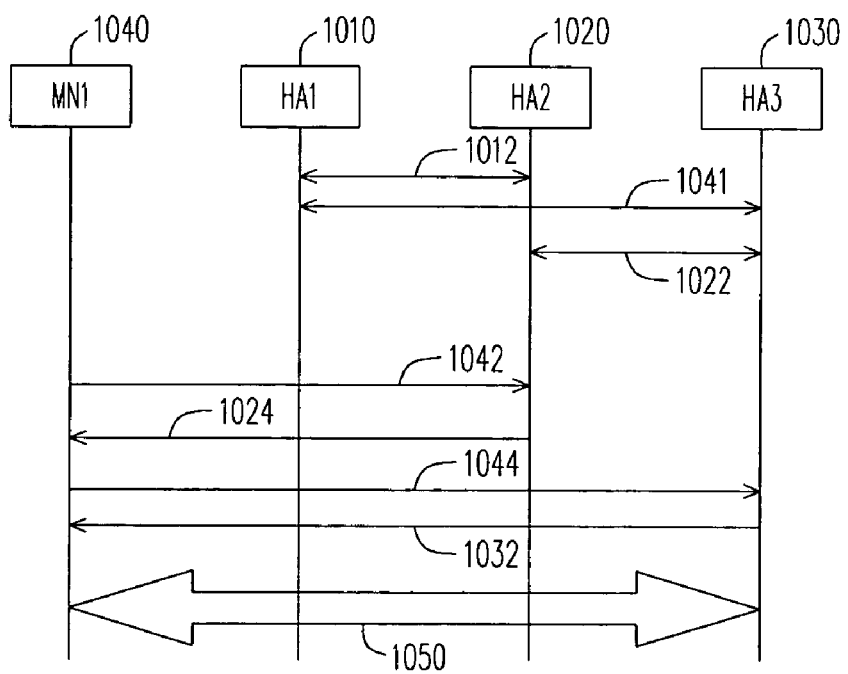
FIG. 10 is a diagram illustrating a method for creating binding and a tunnel between a mobile node and the least loaded home agent (LHA) using a discovery protocol, according to yet another embodiment of the present invention.

Referring to FIG. 10, an example is provided for illustrating the creation of the binding and the tunnel between a mobile node (MN) and the least loaded home agent (LHA) using a discovery protocol such as the Cisco Discovery Protocol (CDP). In another embodiment of the present invention, a discovery protocol, such as the Cisco Discovery Protocol (CDP), enables a node in a Mobile IPv6 network to keep track of all other similar nodes, such as home agents, using a multicast message to handle binding updates and to allow automatic distribution of the load. The CDP is primarily used to obtain protocol addresses of neighboring devices and to discover the platform of those devices for configuring for proper communication compatibility. The CDP may also be used to show information about the interfaces a router uses. The CDP is media-and-protocol independent, and is able to run on all networking equipment including routers, bridges, access servers, and switches. Under the CDP protocol, a load factor may be computed as follows:

$$\text{Load Factor} = \max(C\text{-load}, M\text{-load}, B\text{-load}, N\text{-load}).$$

In FIG. 10, load exchanges using Cisco Discovery Protocol (CDP) are performed between every two of home agents 1010, 1020 and 1030 ("HA1", "HA2", "HA3", respectively hereafter). As shown in FIG. 10, a load exchanging using CDP is respectively performed between HA1 and HA2, HA1 and HA3, and HA2 and HA3. A HA address discovery 1042 is then sent from a mobile node 1040 ("MN1" hereafter) to the HA2 (assuming a binding is established between the HA2 and MN1). A HA address discovery reply 1024 with HA3 identified as the LHA (assuming that HA3 is the LHA) is sent from HA2 to the MN1. A binding update request 1044 is sent from MN1 to HA3. A binding acknowledgment 1032 is then sent from HA3 to MN1, and a binding and tunnel 1050 is established between MN1 and the HA3.

Under the method illustrated in FIG. 10 for the load balancing of HAs using CDP, each of the HAs runs CDP. Each of the HAs advertises that it is running the HA application along with the load information using CDP. Each of the HAs receives the load information advertised as above and builds a HA load balancing table accordingly.

Figure 11:
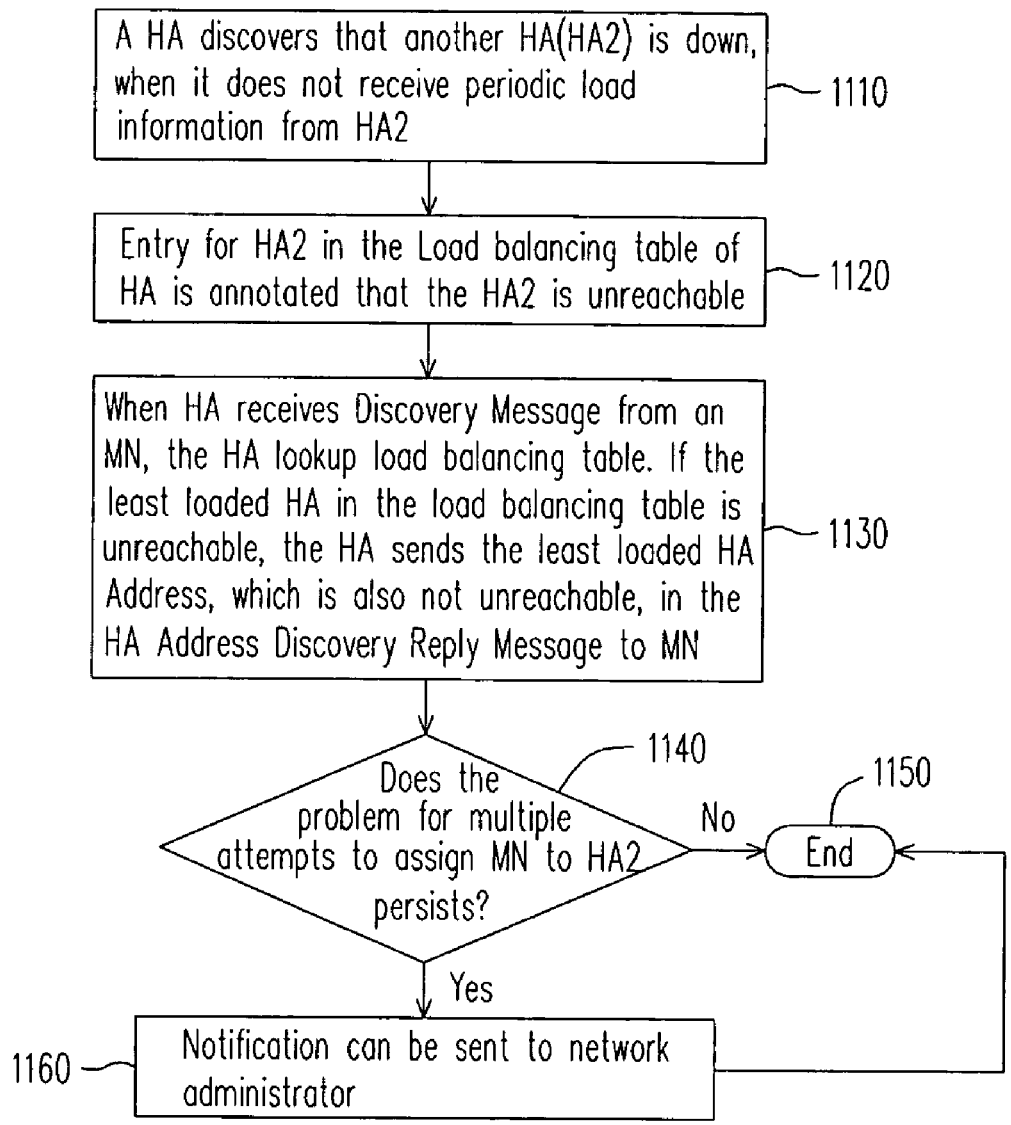
FIG. 11 is a block diagram of a home agent failure detection and recovery method, according to another embodiment of the present invention

According to yet another embodiment of the present invention, a home agent failure detection and recovery method is described with reference to FIG. 11 as follows. A home agent HA (first HA) discovers when a home agent HA2 (second HA) is down by absence of the periodic load information from HA2, as in step 1110. For example, the HA1 is defined as an active home agent in the home network, and the HA2 is defined as a home agent that is experiencing failure. Next, upon detection of a lag in receipt of return expecting advertisement from the HA2 with its new load factor, as in step 1120, an annotation is made to the binding cache of the HA1 that the HA2 is considered unreachable.

In a case when the HA does not receive periodic load information from HA2, the entry for HA2 in the load balancing table of the HA is annotated that the HA2 is unreachable, as in step 1120. When the HA receives a Discovery Message from an MN, the HA lookups load balancing table. If the least loaded HA (LHA) in the load balancing table is unreachable, the HA sends the least loaded HA Address, which is not also unreachable, in the HA Address Discovery Reply Message to MN, as in step 1130. As in the following step 1140, it is determined whether or not problem to assign MN to HA2 persists despite multiple attempts. If yes, the notification is sent to the network administrator, as in step 1160, and the method is ended, as in step 1150. If the problem does not persist, the method is ended, in step 1150.

The security features are consistent with the overall security framework of Mobile IPv6 network. The binding updates and the binding acknowledgement messages may be secured using the IPSec or the authentication protocols as described in RFC 3775 and RFC 4285. On the other hand, the home agent address discovery message and the home agent address discovery reply messages may not require the security options as described in RFC 3775. The aforementioned exchanges of messages do not result in any resource allocation at either the MN or the HA. The messages for exchanging the load factor between the home agents within a home network need not be secured as they would not go beyond the borders of a secured internal network. But if the security of one of the home agents is compromised, the other home agents may be protected with an authentication extension or IPSec.

Primary factor contributing to the determination of the load depends on the number of bindings created/deleted on the home agent. The load may vary slightly every time a binding is created/deleted and hence the load varies a number of times every second, and therefore it may not be necessary for the HA to send an updated load advertisement every time the load changes. Furthermore, the variation in load itself may be minimal or negligible every time a binding is created, and therefore periodical advertisement of the load may be sufficient. The network load is calculated based on assigned QoS, and the assigned QoS may take care of future traffic variations for the binding. Furthermore, a round-robin secondary loading calculation may be utilized when all the HAs are substantially equally loaded to determine the HA that will bind with the appropriate MN illustrated in FIG. 1.

The present invention is directed to a method for reliable load balancing on home agents on a Mobile IPv6 network. The present invention is also directed to a method for detecting and recovering from home agent failures. In an embodiment of the present invention, all of the home agents understand the load on each of the other home agents through the use of modified router advertisement messages. A mobile node, through neighbor discovery, locates the least loaded home agent from the linking home agent. The linking home agent sends the least loaded home agent (LHA) in response to the discovery request from the mobile node by looking up a load balancing table stored. A binding communication is established between the mobile node and the least loaded home agent. The load balancing table is preferably implemented in a software format but may be implemented in hardware format, firmware format or a combination of such formats.

In one embodiment, a router advertisement message in a Mobile IPv6 network includes a field to specify a load factor for each home agent. For instance, a load factor may have a value of 0 under minimum load, and a value of 99 under maximum load, which may be expressed by the following equation:

$$\text{Load Factor} = (\text{Load on the home agent} - \text{Load on the lowest loaded home agent})/(\text{Load on the highest loaded home agent} - \text{Load on the lowest loaded home agent}) \quad [3]$$

The load factor may be rounded off to an established bit of 8 bits or 12 bits.

In yet another embodiment, a dynamic feedback protocol (DFP) is used for creating a binding and a tunnel between a mobile node (MN) and a least loaded home agent (LHA). Under the DFP, a DFP agent subsystem enables client subsystems to act as the DFP agents for sending weight or load information to the SLB. The DFP agent subsystem includes the load balancing systems for the home agents on the Mobile IPv6 networks other than the SLB.

In yet another embodiment of the present invention, a discovery protocol, such as the Cisco Discovery Protocol (CDP), enables a node in a Mobile IPv6 network to keep track of all other similar nodes, such as HAs, using a multicast message to handle binding updates and to allow automatic distribution of the load. CDP is primarily used to obtain protocol addresses of neighboring devices and to discover the platform of those devices for configuring for proper communication compatibility. CDP may also be used to show information about the interfaces a router uses. CDP is media-and-protocol independent, and is able to run on all networking equipment including routers, bridges, access servers, and switches. Under the CDP protocol, a load factor may be computed as follows:

$$\text{Load Factor} = \max(C\text{-load}, M\text{-load}, B\text{-load}, N\text{-load}) \quad [4]$$

where C-load, M-load, B-load, and N-load may represent a plurality of parameter values which are set between 0 and 1, respectively.

According to another embodiment of the present invention, a fault detection and recovery method for home agent may be used to monitor failure mechanisms among the home agents and/or external communication links.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. In a mobile network comprising a plurality of mobile nodes and a plurality of home agents serving a prefix, a home agent comprising:

a response mechanism adapted to receive a home agent address discovery request from at least one of the plurality of mobile nodes and to return the address of a selected one of the plurality of home agents, wherein an address corresponds to the least loaded home agent among the plurality of home agents serving the prefix; and a load balancing mechanism adapted to acquire, from other home agents serving the prefix, information related to each of the other home agents loading, wherein the load balancing mechanism determines a load factor that is calculated using a load factor generation algorithm and based on the calculated load factor, dynamically ranks the home agents serving a prefix to identify the least loaded home agent, wherein the load factor is calculated using an equation: Load Factor=(Load on the home agent−Load on a least loaded home agent)/(Load on a highest loaded home agent−Load on the least loaded home agent).

2. The home agent as claimed in claim 1, wherein the information is exchanged between home agents serving the prefix as a router advertisement message.

3. The home agent as claimed in claim 1, wherein the router advertisement message comprises a plurality of bits stored in a header field.

4. The home agent as claimed in claim 1, wherein the calculation of the load factor includes the information relating to CPU availability, memory availability, bandwidth availability, and number of bindings for each of the home agents.

5. The home agent as claimed in claim 1, wherein the load balancing mechanism acquires the information from the other home agents using a Cisco Discovery Protocol.

6. The home agent as claimed in claim 1, wherein the load factor is calculated using an equation: Load Factor=max(C-load, M-load, B-load, N-load), wherein C-load, M-load, B-load, and N-load represent information having values of between 0 and 1.

7. A method for load balancing a plurality of home agents, the method comprising:

calculating a load factor in accordance with the following equation:

Load Factor=max($C$-load, $M$-load, $B$-load, $N$-load), wherein the C-load is a predicted load on a CPU of a home agent, the C-load being expressed by the following equation:

$C$-load=$(1-P)$*($C$-load of a previous reporting period)+$P$*(average utilization of a CPU in a current reporting period), wherein P captures a historical CPU utilization, the M-load is a predicted load on the memory unit, the B-load is a load factor parameter value for available bandwidth, and the N-load is a load factor parameter value for determining a number of bindings that can be established in a home network; and responding to an address discovery request by returning the address of a selected one of the plurality of home agents wherein the address corresponds to a least loaded home agent among the plurality of home agents serving the prefix.

8. The method as claimed in claim 7, wherein the P is set between 0 and 1.

9. The method as claimed in claim 7, wherein the M-load is expressed by the following equation:

$M$-load=(amount of an actual memory used in the memory unit)/(total memory available in the memory unit).

10. The method as claimed in claim 7, wherein the B-load is expressed by the following equation:

$B$-load=(the total assigned bandwidth)/(total available bandwidth), wherein the total assigned bandwidth is a sum of the assigned bandwidth to each binding based on QoS settings for each binding.

11. The method as claimed in claim 7, wherein the N-load is expressed by the following equation:

$N$-load=(number of bindings established)/(maximum number of bindings permitted).

12. A method for load balancing bindings among a plurality of home agents in a mobile network, the method comprising:

periodically determining a least loaded active home agent from among the plurality of home agents in a home network by dynamically ranking the home agents serving a prefix to identify the least loaded active home agent, and by calculating a load factor using a load factor generation algorithm and based on the calculated load factor, wherein the load factor is calculated using an equation: Load Factor=(Load on the home agent−Load on a least loaded home agent)/(Load on a highest loaded home agent−Load on the least loaded home agent);

in response to an address discovery request from a mobile node, performing a home agent address discovery reply to the mobile node using the address of the active least loaded home agent; and establishing a binding between the mobile node and the least loaded active home agent.

13. The method as claimed in claim 12, further comprising:
performing a load exchange;
annotating a load balancing table of a first home agent upon detecting a lag in receipt of a response to the load exchange from the least loaded active home agent with a load factor indicator indicating that the least loaded active home agent is not a least loaded home agent; and
designating another home agent in the load balancing table of the first home agent as the least loaded active home agent.

14. The method as claimed in claim 13, wherein the load exchange is based on a dynamic feedback protocol (DFP).

15. The method as claimed in claim 13, wherein the load exchange is based on the Cisco Discovery Protocol.

16. The method as claimed in claim 13, wherein the load exchange is based on a round-robin secondary loading calculation.

17. A method for establishing a binding between a home agent and a mobile node, the method comprising:
receiving a home agent discovery message from the mobile node by an active home agent;
determining an address of a least loaded home agent maintained in a load balancing table, wherein the least loaded home agent is determined by dynamically ranking a plurality of home agents serving a prefix to identify the least loaded home agent, and by calculating a load factor using a load factor generation algorithm and based on the calculated load factor, wherein the load factor is calculated using an equation: Load Factor=(Load on the home agent−Load on a least loaded home agent)/(Load on a highest loaded home agent−Load on the least loaded home agent); and sending the address of the least loaded home agent in a home agent address discovery reply message to the mobile node to initiate the binding between the least loaded home agent and the mobile node.

18. The method as claimed in claim 17, further comprising monitoring for a failure mechanism among each home agent associated with the address maintained in the load balancing table.

19. An apparatus, adapted to a mobile network comprising a plurality of mobile nodes and a plurality of home agents, the apparatus comprising:
   a load balancing mechanism that periodically determines a least loaded active home agent from among the plurality of the home agents in the home network, wherein the least loaded active home agent is determined by dynamically ranking the home agents serving a prefix to identify the least loaded active home agent, and by calculating a load factor using a load factor generation algorithm and based on the calculated load factor, wherein the load factor is calculated using an equation: Load Factor=(Load on the home agent−Load on a least loaded home agent)/(Load on a highest loaded home agent−Load on the least loaded home agent); and
   a response mechanism, in response to an address discovery request from the mobile node, that performs a home agent address discovery reply to the mobile node using the address of the active least loaded home agent to establish a binding between the mobile node and the least loaded active home agent.

20. The apparatus as claimed in claim 19, wherein the load balancing mechanism performs a load exchange, annotates a load balancing table of a first home agent upon detecting a lag in receipt of a response to the load exchange from the least loaded active home agent with a load factor indicator indicating that the least loaded active home agent is not a least loaded home agent, and designates another home agent in the load balancing table of the first home agent as the least loaded active home agent.

21. The apparatus as claimed in claim 20, wherein the load exchange is based on a dynamic feedback protocol (DFP).

22. The apparatus as claimed in claim 20, wherein the load exchange is based on the Cisco Discovery Protocol.

23. The apparatus as claimed in claim 20, wherein the load exchange is based on a round-robin secondary loading calculation.

24. In a mobile network comprising a plurality of mobile nodes and a plurality of home agents serving a prefix, a home agent comprising:
   means for receiving a home agent address discovery request from at least one of the plurality of mobile nodes and for returning the address of a selected one of the plurality of home agents, wherein an address corresponds to a least loaded home agent among the plurality of home agents serving the prefix, wherein the least loaded home agent is determined by dynamically ranking the home agents serving a prefix to identify the least loaded home agent, and by calculating a load factor using a load factor generation algorithm and based on the calculated load factor, wherein the load factor is calculated using an equation: Load Factor=(Load on the home agent−Load on a least loaded home agent)/(Load on a highest loaded home agent−Load on the least loaded home agent);
   means for acquiring information related to load of each of the other home agents from other home agents serving the prefix, and for determining a load factor that is calculated using a load factor generation algorithm and based on the calculated load factor; and
   means for dynamically ranking the home agents serving a prefix to identify the least loaded home agent.

25. The home agent as claimed in claim 24, wherein the calculation of the load factor includes the information relating to CPU availability, memory availability, bandwidth availability, and number of bindings for each of the home agents.

26. A method for load balancing bindings among a plurality of home agents in a mobile network, the method comprising:
   receiving a discovery message from a mobile node, and looking up a load balancing table to find the least loaded home agent (LHA), wherein the LHA is determined by dynamically ranking a plurality of home agents serving a prefix to identify the LHA, and by calculating a load factor using a load factor generation algorithm and based on the calculated load factor, wherein the load factor is calculated using an equation: Load Factor=(Load on the home agent−Load on a least loaded home agent)/(Load on a highest loaded home agent−Load on the least loaded home agent);
   replying a discovery reply message with an address of the LHA to the mobile node; and
   establishing a binding between the mobile node and a least loaded active home when the LHA in the load balancing table is annotated as unreachable and failure of establishing binding between the mobile node and the LHA persists over a predetermined times, and sending a notification accordingly.

27. The method of claim 26, wherein when one of the home agents is discovered to be down in absence of sending a periodic load information, the home agent is annotated as unreachable.

28. The method of claim 26, wherein the notification is sent to an administrator of the mobile network.

* * * * *